United States Patent [19]
Yoshimura

[11] 3,797,431
[45] Mar. 19, 1974

[54] METHOD OF MANUFACTURING THE BODY OF A NECK-IN CAN AND AN APPARATUS USED THEREFOR

[75] Inventor: Takayuki Yoshimura, Tokyo, Japan

[73] Assignee: Daiwa Can Company Limited, Tokyo, Japan

[22] Filed: July 5, 1972

[21] Appl. No.: 269,275

[30] Foreign Application Priority Data
Aug. 6, 1971 Japan.............................. 46-59019

[52] U.S. Cl. ............... 113/120 AA, 72/348, 83/914
[51] Int. Cl. ............................................ B21d 51/26
[58] Field of Search ........ 72/40, 348; 113/7 R, 7 A, 113/120 R, 120 AA; 83/914; 90/25.01

[56] References Cited
UNITED STATES PATENTS
3,581,691  6/1971  Ringler ............................. 83/914
3,538,874  11/1970  Sawert ........................... 113/120 H
3,029,507  4/1962  Gaggini ............................ 72/348

*Primary Examiner*—Richard J. Herbst

[57] ABSTRACT

In the manufacture of the body of an ordinary neck-in can, the metal blank obtained from the metal sheet is subjected to drawing and ironing to form a cylindrical body with a bottom end, which is then subjected to trimming along the peripheral edge of the upper opening whereby the burr projected from the edge by trimming is crushed down before said cylindrical body is passed to the subsequent step. An apparatus for crushing down the burr is also provided.

In this apparatus the burr is crushed down by means of the relative rotary movement between said cylindrical body having the burr formed and a roller provided for breaking down said burr.

4 Claims, 15 Drawing Figures

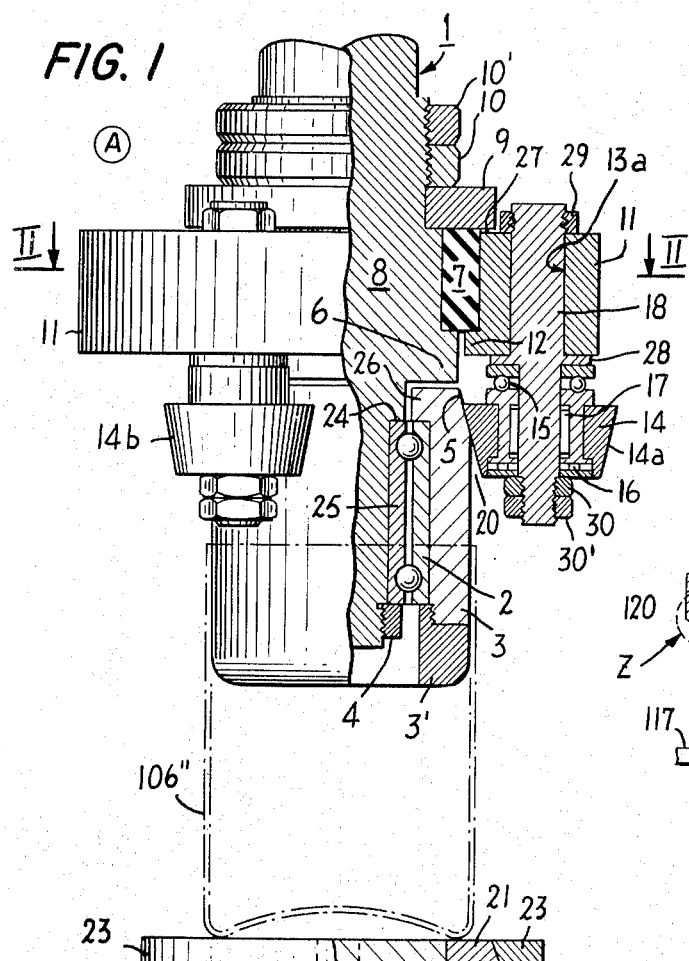

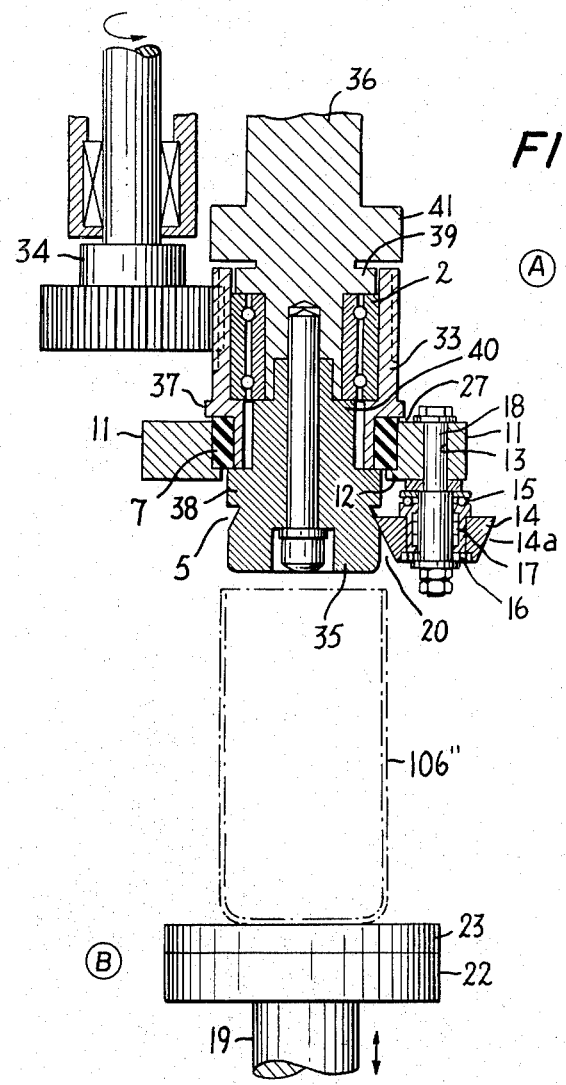
FIG. 3
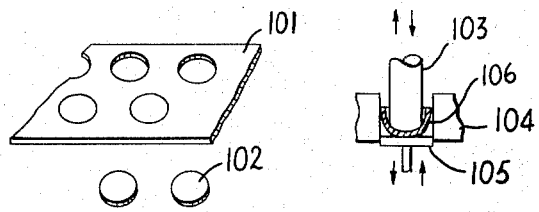
FIG.4a     FIG.4b
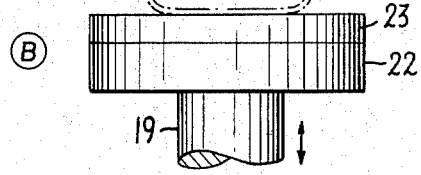
FIG.4c
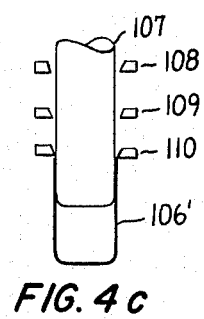
FIG.4d
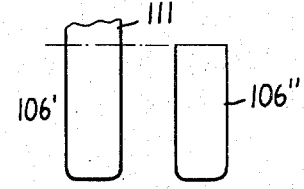
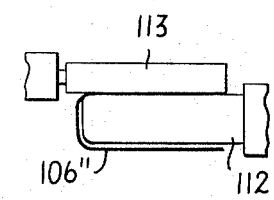
FIG.4e
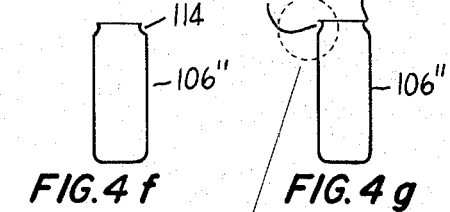
FIG.4f     FIG.4g
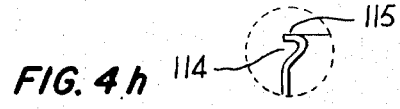
FIG.4h

METHOD OF MANUFACTURING THE BODY OF A NECK-IN CAN AND AN APPARATUS USED THEREFOR

BACKGROUND OF THE INVENTION

This invention relates to a method for the manufacture of a neck-in can or a cylindrical can with a bottom end having the inwardly projected groove portion formed along the entire peripheral edge of the opening and to an apparatus to be used for such method. More particularly, it relates to a method for the manufacture of the body of such can which is formed from aluminium sheet or tin plate, particularly from the latter, by means of drawing and ironing and is provided with the upper opening having its peripheral edge and its vicinity compressed inwardly while a part of the compressed portion expanded outwardly so as to form said groove portion.

The body of the neck-in can has heretofore been formed as follows:

A circular blank having a predetermined size is punched out of a metal sheet having a proper thickness, which blank is drawn to the shape of a cup. The cup-like semiproduct thus formed is re-drawn and subjected to ironing several times so that a cylindrical body with a bottom end having an elongated height and a thinly stretched wall is obtained. The resulting cylindrical body is subjected to trimming with respect to its peripheral edge to make all of uniform height.

Coating is then applied to the inner and the outer surface of the can, which is thereafter dried.

The edge portion of the trimmed opening is then compressed toward the inside of the cylindrical body to effect the neck-in work or to form a neck portion having a smaller diameter.

Then the portion of the neck corresponding to half of its height is subjected to flanging by radially expanding the same, whereby the product can body is obtained.

However, in the conventional mass production process of the neck-in can of the above kind, it usually happens that there occurs a burr or a portion projected outwardly from the wall of the cylindrical can body along a whole or a part of the peripheral edge of the trimmed opening of said can body. It is quite difficult to avoid this. The size and strength of the burr are short and weak in case of the aluminium material but long and strong in case of the tin plate material.

When the semi-product having the burr formed is passed to the subsequent step such as printing or neck-in work, the printing roll usually made of elastic material such as rubber will be injured and its life shortened. In addition thereto, when it is desired to form a neck-in part along the edge of the opening of the cylindrical body after trimming, the burr portion is more resistant to the neck-in compression than the portion free from the burr, for the entire body wall has been hardened, particularly with the case of tin plate, as a consequence of drawing and ironing. Accordingly, it becomes impossible to uniformly compress the entire circumference of the cylindrical body with the result that longitudinal wrinkles parallel to the direction of the axis of the cylindrical body appear. If these wrinkles appear, the resistance to compression in the direction of the axis of the cylindrical body becomes extremely higher in the wrinkle parts than in the parts free from such wrinkles. Accordingly, there occurs a phenomenon in the neck-in work that the cylindrical body is deformed in the direction of the axis thereof, which results in lack of uniformity. This defect becomes distinct particularly when the tin plate is used as the material and the body wall is elongated quite thinly by ironing in an attempt to save the material therefor. The defect caused by the burr is not limited to the above. Even if one manage to effect the neck-in work with the material having the burr, it is difficult in the flange work involving elongation to avoid a flange cracking in the direction of the axis of the cylindrical body, since the tensile stress is focussed into the part adjacent to the burr. Once the flange cracking occurs, the body of the can cannot maintain sealability any longer even when the cover is double seamed thereto. It is therefore an object of the invention to provide a method for the manufacture of the body of a neck-in can in the printing step subsequent to trimming by crushing down the burr caused by trimming along the peripheral edge of the opening of the cylindrical body so as not to injure the printing roll.

It is another object of the invention to provide a method for the manufacture of the body of a neck-in can which has no fear of giving wrinkles anywhere in the work piece, that is, no fear of giving strains in the body wall in the neck-in work.

It is still another object of the invention to provide a method for the manufacture of the body of a neck-in can free from flange-cracking in the flanging work.

It is still another object of the invention to provide a method for the manufacture of the body of a neck-in can without causing rejects by adding a step of crushing down the burr between the trimming step and the subsequent steps.

It is further an object of the invention to provide an apparatus adapted for crushing down the burr.

It is still further an object of the invention to provide the body of a can without injuring a printing roll in the printing step, without deforming the body wall in the neck-in work and without causing flange cracking in the flange work.

These and other objects of the invention will become apparent from the description of the specification.

SUMMARY OF THE INVENTION

According to the present invention, there is provided a method for the manufacture of the body of a neck-in can which comprises drawing a circular blank into a cup-like product, said blank having been punched out of an original material sheet, subjecting said product to redrawing and ironing to form a cylindrical body with a bottom end, trimming the peripheral edge of the opening thereof, e.g., by using two circular cutters, thereafter passing the product to a step whereby the burr caused in the peripheral edge of said opening as a result of the trimming is crushed down with rolls toward the wall of the cylindrical body without cutting said burr so as to transform the outer peripheral edge of said opening into a smooth slope and then passing the product into the subsequent steps such as coating, printing, neck-in, flanging, etc.

According to the present invention, there is also provided an apparatus adapted for use in the step of crushing down the burr which comprises a burr crushing means and a means to support a cylindrical body with a bottom end provided coaxially below said burr crushing means, said burr crushing means consisting of a fixed shaft; an annular ring rotatably and concentrically mounted around the circumference of the lower portion of said shaft; said ring having the outer diameter slightly smaller than the inner diameter of the cylindrical body to be worked and having a sloping portion on the upper peripheral edge thereof converging toward the axis of said shaft; an annular resilient body above said ring tightly surrounding around said fixed shaft, a part of said resilient body projecting radially and outwardly from said shaft. An annular ring intimately engaged with the circumference of said resilient body, said ring having a projecting flange on the lower and inner end thereof, the upper surface of which flange is brought into contact with the lower projecting surface of said resilient body, the upper end surface of said ring being placed slightly lower than that of said resilient body; an inverted truncated conical roll rotatably fixed on the lower projecting portion of a shaft, said shaft being inserted through the respective holes pierced at suitable positions on said annular ring, the sloping portion of said roll having the same sloping angle as that of the sloping portion of the upper portion of said annular ring, at least a part of said sloping portion of the former contacting softly with said sloping portion of the latter and another part of said sloping portion of the former projecting downwardly from said sloping portion of the latter; and a means fixed around said fixed shaft and adapted for locking said resilient body; said means to support a cylindrical body consisting of a stand capable of rotating and moving up and down by a suitable means and a means to suck and fix said cylindrical body on said stand. There is further provided an apparatus which comprises a burr crushing means and a means to support a cylindrical body with a bottom end provided coaxially below said burr crushing means, said burr crushing means consisting of a fixed shaft composed of the upper stationary shaft and the lower fixed member; a rotary ring rotatably and co-axially mounted around the lower portion of said upper stationary shaft; a driving means to rotate said rotary ring; an annular resilient body intimately engaged with said ring, a part of said body projecting radially and outwardly from said lower fixed member; an annular ring intimately engaged with the circumference of said resilient body, said ring having a projecting flange on the lower and inner end thereof, the upper surface of which flange is brought into contact with the lower projecting surface of said resilient body, the upper end surface of said ring being placed slightly lower than that of said resilient body; and an inverted truncated conical roll rotatably fixed on the lower projecting portion of a shaft, said shaft being inserted through the respective holes pierced at suitable positions on said annular ring; and lower fixed member having the outer diameter slightly smaller than the inner diameter of the cylindrical body to be worked and having a notched portion obliquely cut at a predetermined position around the circumference of the lower body thereof, the sloping surface of said notched portion being consistent with that of said roll, at least a part of the sloping surface of said roll contacting softly with that of said roll, another part of the sloping surface of said roll extending outwardly from said notched portion; said means to support a cylindrical body consisting of a stand capable of moving up and down by a suitable means and a means to suck and fix said cylindrical body on said stand.

BRIEF DESCRIPTION OF THE DRAWINGS

FIG. 1 is an elevational view of one embodiment of the apparatus of the invention shown as section in the right half thereof.

FIG. 2 is a sectional plan view taken along the line II—II of FIG. 1.

FIG. 3 is a partly sectional, elevational view of another embodiment of the apparatus of the invention.

FIGS. 4a–4h are schematic views illustrating a series of ordinary steps for forming the neck-in can.

FIG. 5 shows in exaggerated detail an example of a burr caused by trimming in the peripheral edge of the opening of the cylindrical body of a can.

FIG. 6a is a fragmentary view illustrating an ordinary neck-in operation as effected on a cylindrical can in accordance with the present invention.

FIG. 6b is an enlarged view of FIG. 6a as contained in the circle Z depicted in FIG. 6a.

FIG. 7 is a sectional view of one example of the peripheral edge of the opening of a cylindrical body obtained by the use of the present invention.

THE PREFERRED EMBODIMENT OF THE INVENTION

In FIG. 4 (a), a circular blank or disk 102 having a predetermined size is punched out of a metal sheet 101. In (b), the blank 102 is drawn by a punching member 103 in a die member 104 and thereby a cup-line product 106 is formed. After the punching member 103 is removed, the product 106 is withdrawn from the member 104 by means of a knock-out plate 105. In (c), the product 106 is then transferred to a redrawing and ironing apparatus whereby said product 106 is forced to pass through the redrawing member 108 and the ironing die ring 109 by means of a punch core 107. A cylindrical body 106′ with a bottom end having a thinly elongated wall is thus obtained, which is then stripped off from the core 107 by means of a nail 110. After any lubrication oil attached in the preceding step is washed out of the body 106′, the edge 111 of the mouth or opening thereof is subjected to trimming in (d) so as to obtain a body 106″ having a predetermined height. Thereafter coating is applied, if necessary, to the inside and/or the outside (bottom) of the body 106″, which is then dried and cured. In (e), the body 106″ is inserted into a rotary mandrel 112, supported thereby, and subjected to the desired printing on the outer surface thereof by means of a resilient printing roll 113 contacting therewith. After the printed body is dried and cured, the peripheral edge of the opening thereof is squeezed inwardly to form a neck-in part 114 in (f). Then about half of the height of the neck-in part is expanded outwardly to form a flange part 115 in (g).

In one example for making a 211φ beer can, the thickness of the original metal sheet is about 0.3 mm to 0.35 mm for a 211φ beer can, and the thickness of the finished body wall is about 0.15 mm to 0.20 mm.

An embodiment of the apparatus for trimming with two circular cutters the peripheral edge of the opening of the cylindrical body 106′ in the step (d) is disclosed, e.g., in the specification of U.S.P. 3,425,251. In this trimming step, a burr 116 as shown in FIG. 5 projecting outwardly from the body wall may occur partly or entirely around the circumference of the trimmed edge. It occurs more often when the material is made of tin plate than when it is made of aluminium since the former is more malleable than the latter. The length of the burr projecting from the body wall is very short, i.e., about 0.05 mm to 0.1 mm.

However, once the burr occurs, if very short, it gives undesirable results in the subsequent steps. In such a printing step as shown in FIG. 5(e), it will injure the printing roll 113 and also exerts the following adverse effect in the neck-in work.

In the usual practice for forming the neck-in part, the cylindrical body 106" within a bottom end and trimmed at the open end is mounted on a lifter-plate 117 as shown in FIG. 6, which is elevated toward a neck-in forming guide 118. An annular guide recess 119 is provided on the bottom surface of the guide 118 and the edge of the opening of the body 106" is forced to slide between the curved surface 120 and the opposite guide member 121 into the recess 119 whereby it is compressed or squeezed inwardly. As a result of it, the neck-in part 114 (FIG. 5 (f)) is formed around the edge of the cylindrical body 106", which part is composed of a short linear portion 122 parallel to the axis of the body and an arc portion 123 adjacent thereto. The width of the recess is made slightly larger than the thickness of the wall of the body 106".

In such a neck-in forming step, a burr portion around the edge of the opening of the body 106", if any, will show a stronger resistance against compression than a portion free from the burr when the edge of the opening of the body 106" is squeezed or drawn in, which results in irregular compression upon the edge, giving wrinkles where the burr exists. In case that such wrinkles appear, the wrinkle portions can not proceed into the recess 119 any farther, and yet the body is still pushed upwards. Consequently, the compressing stress is exerted thereupon in the direction of the axis of the body, deforming the body wall and making the height of the can irregular. Moreover, the flange cracking as set forth above becomes unavoidable.

As hereinbefore mentioned, undesirable results occur when the burr caused by trimming in the edge of the opening is not removed. In the practice of the present invention, therefore, a step for crushing down such burr is newly provided between the trimming step (FIG. 5 (d)) and the subsequent coating or printing step (FIG. 5 (e)). In the crushing-down step, the burr is crushed down with rolls so that the peripheral edge of the opening of the body may be transferred into a smooth slope (FIG. 7). An apparatus adapted for use therein is also provided.

In an embodiment of FIG. 1, the apparatus comprises a burr crushing means (A) and a means (B) to support the cylindrical body 106" having a bottom end. The burr crushing means (A) consists of three main parts. The first part is a shaft 1 fixed to a proper supporting means (not shown). The second part is an annular ring 3 rotatably and concentrically mounted around the circumference of said shaft via a ball bearing 2. The third part is an assembly which comprises a wide peripheral ring 11 rotating around the shaft 1, a small shaft 18 inserted into said ring 11 and a roll 14 of an inverted truncated conical shape which can be rotatavely mounted upon the lower projecting part of the shaft 18.

As shown in FIG. 1, the thread is made on the lower end of the shaft 1 which is intended for receiving a nut 4 to fix the bearing 2. Above the threaded part, there is a shoulder 24 slightly projecting outwardly, the height of which depends upon the length of the bearing 2. The bearing 2 may be concentrically fixed to the shaft 1 surrounding the cylindrical portion 25 thereof so that the upper end of the bearing butts against the lower surface of the shoulder while the lower end of the bearing is supported by the nut 4. The annular ring 3 is fixed concentrically to the shaft 1 via the bearing 2, the length of the ring 3 being twice as long as that of the bearing 2. Thus on the upper end of the ring 3 is provided a flange portion 26 to be engaged with the outer ring of the bearing 2. Moreover, on the inner surface of the ring 3 projecting below beyond said outer ring of the bearing 2 is threaded so as to fix a lock ring 3' thereon. Since the ring 3 is fixed over the outer ring of the bearing 2 by virtue of the flange 26 and the lock ring 3', it can rotate by the ball bearing 2 around the shaft 1. The outer diameter of the ring 3 is equal to that of the lock ring 3', which diameter is made slightly smaller than the inner diameter of the cylindrical body 106". It is preferable that the outer peripheral edge of the lock ring 3' is made round as shown so that the ring 3 including said ring 3' may enter into the cylindrical body 106" smoothly. In addition, the ring 3 has a sloping portion 5 on the upper peripheral edge thereof, which converges toward the axis of the shaft 1. The sloping angle of said portion 5 should preferably be between about 10° and about 15°, though not limited thereto. This portion 5 should be aligned with the sloping portion 14a (hereinafter mentioned ) of the roll 14. Accordingly, if one angle is determined, so is determined the other angle. The ring 3 and the roll 14 are both made of rigid body. Above the shoulder 24 of the shaft 1 is there a flange portion 6 projecting outwardly by a distance corresponding to the width of the flange portion 26. Above said portion 6 is integrally formed a cylindrical portion 8 having an outer diameter less than that of said flange portion 6. The circumference of the cylindrical portion 8 is tightly surrounded by an annular resilient body 7, the outer diameter of which is larger than that of the flange portion 6 so that the outer surface of the body 7 will project radially and outwardly from the surface of the portion 6. The resilient body 7 can be grasped by a lock ring 9 and said portion 6, and said ring 9 is in turn locked by nuts 10 and 10'.

A relatively wide annular ring 11 is intimately engaged with the outer circumference of the resilient body 7 such that the inner surface of the former is brought into frictional contact with the outer surface of the latter. On the lower and inner end of the ring 11 is mounted a projecting flange 12, the upper surface of which is brought into intimate contact with the lower projecting surface of the body 7. When it is desired to set the ring 11, the upper end surface thereof should preferably be placed very slightly lower than that of the body 7 so that there may be a small clearance 27 existing between the ring 9 and the ring 11.

As clearly shown in FIG. 2, there are several, at least two, holes pierced in the ring 11 in the direction parallel to the axis of the shaft 1. In FIG. 2, the holes are shown as 13a, 13b and 13c but they are not limited thereto, of course. It is desirable that the circumferential distance between each hole is substantially equal. As hereinafter described, the shaft 18 which will support the inverted truncated conical roll 14 is inserted through the respective holes 13, which shaft can be fixed to the ring 11 by any suitable means such as nut, etc. These holes must thus be pierced at such positions that the step to fix the shaft will not hinder the subsequent step to engage the ring 9 with the shaft 1. In FIG. 2 are shown the holes as having the respective centers on the dotted circle passing through the middle line of the width of the ring 11, but they are not limited thereto, of course.

In case of inserting the shaft 18 into the ring 11, it can be inserted from below, and fixed tightly to the ring 11 by a nut 29 when a flange portion 28 placed at a predetermined position depending upon the length of the ring 11 butts against the lower surface of the ring.

The shaft 18 is provided with a projecting portion extending downwardly from the flange portion 28. The roll 14 is firmly fixed to the projecting portion between the thrust bearings 15 and 16 attached to the shaft 18 by means of nuts 30 and 30'. The reference numeral 17 indicates a roller bearing by which the roll 14 can rotate around the shaft 18. This roll 14 is the only part that can rotate in the assembly consisting of the ring 11, the shaft 18 and the roll 14. The roll 14 can only rotate around its own axis at a constant position, of course.

As set forth hereinabove, the sloping portion 14a of the roll 14 should have an angle consistent with that of the sloping portion 5 on the ring 3. In addition, when the roll 14 is set rotatably on the shaft 18, the portion 14a should contact softly with the portion 5 at least at a part thereof in a parallel relation and also a part of the portion 14a should extend below the lower end of the portion 5.

The means (B) to support the cylindrical body with the bottom end is mounted below, and on the same axis of, the burr crushing means. The structure is such that an annular magnet 21 is concentrically embedded into the surface of a circular stand 22 mounted on a supporting shaft 19 capable of rotating and moving up and down, and fixed thereto by means of an annular ring 23. The magnet 21 has a size to match with that of the cylindrical body 106" and is intended to act upon the bottom of the cylindrical body 106" to thereby support the body itself on the predetermined position. The magnet 21 is shown as an annular member in the drawing but is not limited thereto. Moreover, a magnet of this kind is suitable for the cylindrical body made of tin plate, while a vacuum suction means may be suitable for that made of aluminium. Such vacuum suction means can be of a conventional type. In FIG. 1, for example, a hole 31 may be pierced through a suitable position on the stand 22, to which is connected a pipe 32 leading to a vacuum pump P operable by means of a timer. Alternatively, other means than such magnet or vacuum suction means, e.g., an index turret can also be used to support the cylindrical body.

In FIG. 1, the burr crushing means (A) and the supporting means (B) are shown to be set in a vertical line, but it is possible to set them in a horizontal line.

The means (B) may be operated as follows. The cylindrical body 106" with a bottom end as trimmed is co-axially mounted on the stand 22 of the means (B) with its opening upwards. The body is thus sucked and fixed thereon by means of the magnet 21. Then the shaft 19 is actuated to lift up the stand 22 whereby the body 106" will finally swallow the rings 3 and 3' of the means (A). The stand 22 is still elevated and the body 106" is thereby elevated along the outer surface of the ring 3. The edge of the opening of the body as trimmed or cut thus enters into a triangular vacant space 20 which is defined by the sloping surface 14a of the roll 14 and the vertical surface below the sloping surface 5 of the ring 3. The stand 22 is caused to stop when the edge of the opening is pinched between the surface 14a and the vertical surface of the body of the ring 3. The relation between the extent to which the edge of the opening of the cylindrical body enters between the surface 14a and the vertical surface of the ring 3 and the time when the upward motion of the stand 22 is caused to stop can be predetermined. For example, it can be such that in FIG. 7, the outer peripheral edge of the opening has a crushed portion which is transformed into a smooth slope with a container-axial width ($d$) of about 1 mm. In FIG. 7, the sloping angle $\Theta$ must naturally be consistent with the sloping angle of the roll 14 or the portion 5 of the ring 3. When the upward motion of the stand 22 is caused to stop, the cylindrical body 106" is pinched at three positions since there are three rolls 14 in this example. After the stand 22 stops, it is allowed to rotate with the body 106" on it by means of rotation of the shaft 19. As set forth hereinbefore, the inner surface of the body 106" contacts with the outer surface of the ring 3. Since the ring 3 can rotate around the shaft 1 by means of the bearing 2, the body 106" will rotate around its own axis with a part of the peripheral edge of the opening pinched between the roll 14 and the ring 3. As the body rotates in this way, the roll 14 rotates in a direction opposite thereto. The rotation of these two rigid bodies i.e., the ring 3 and the roll 14, will crush down the burr appearing on the peripheral edge of the opening of said body, which transforms said peripheral edge into a smooth slope.

When the upward motion of the stand 22 of the supporting means (B) is caused to stop, the edge of the opening of the body 106" is more or less wedged in between the roll 14 and the vertical surface of the ring 3, which results in that the roll 14 is pushed upwards and/or outwards even if slightly. Such behavior of the roll 14 is however, absorbed entirely by the resilient body 7 and the clearance 27, which exerts no adverse effect upon others. Thus, the upward movement of the roll 14 will push the ring 11 upwards, which may be absorbed by the resilient body 7 and the clearance 27, while the outward movement thereof may be absorbed by so much deformation of the body 7. Furthermore, even if there occur irregular burrs 116 on the peripheral edge of the opening, the resilient body 7 serves to prevent imparting larger load upon a particular inverted truncated conical roll. In addition, as the burrs are crushed down one by one according to the mutual rotation of the roll 14 and the body 106", each roll may finally be reinstated to the right or concentric position even if the original position thereof is eccentric to the shaft 1. Therefore, with the rotation of the cylindrical body 106", the peripheral edge of the opening thereof will eventually have a substantially equal thickness.

In the above embodiment, the structure of rotating the cylindrical body is described. It is, however, obvious that instead of rotating the cylindrical body, the objects of the invention can also be accomplished by allowing the roll 14 to rotate around the circumference of the cylindrical body while rotating the roll 14 around its own axis.

One such example is shown in FIG. 3. In this structure, the burr crushing means (A) corresponding to that of FIG. 1 is rotatably mounted around the lower side of the body of a stationary shaft 36 by means of a ball bearing 2. Said ball bearing is pinched and fixed by the lower flange 39 of said shaft 36 and the upper shoulder 40 of a lower fixed member 35 hereinafter described. The means (A) includes a rotary ring 33 which is allowed to rotate by means of a suitable driving means 34; an annular resilient body 7 intimately engaged with said ring 33 and fixed between a flange portion 37 of said ring 33 and a lower shoulder 38 of the member 35, a part of which resilient body extends radially and outwardly from the member 35; an annular ring 11 fixed around said body 7; an inverted, truncated conical roller 14 rotatably mounted around the lower projecting part of a shaft 18 inserted into a hole 13 pierced through the ring 11 at suitable position; and the lower fixed member 35 having a sloping portion 5 softly contacted in parallel with said roller 14 and an adjacent vertical portion. The member 35 is formed separately from the shaft 36 and connected by a suitable means to the latter. The outer diameter of the member 35 is made slightly smaller than the inside diameter of the cylindrical body 106″. Generally speaking, the same reference numerals in FIG. 3 as that in FIG. 1 indicate the same part thereof, except that the numeral 27 in FIG. 3 shows a vacant space formed between the ring 11 and the flange portion 37 of the ring 33, and the sloping portion 5 engaged with the sloping surface 14a of the roller 14 appears as a notched surface obliquely cut around the circumference of the lower body of the member 35 at a predetermined position thereof. It is same as is the case of FIG.1 that a part of the sloping surface 14a enters into the notched portion to thereby bring the surface 14a into contact with the portion 5 while the other part of the sloping surface 14a extends outwardly from said notched portion. It is also preferable that the lower edge of the member 35 should be rounded. The means (B) to support the cylindrical body with an end in FIG. 3 is not explained since it is substantially identical with the means (B) shown in FIG. 1 except that its shaft 19 does not rotate but only moves up and down. In the apparatus shown in FIG. 3, the ring 33 pinched between the upper flange 41 of the upper shaft 36 and the lower shoulder 38 of the member 35 is caused to rotate by the driving means 34 whereby the resilient body 7, the ring 7 and the roll 14 are allowed to rotate around the circumference of the member 35 and the shaft 36.

As set forth above, the supporting means (B) itself does not rotate but moves up and down. Thus, when the edge of the opening of the cylindrical body 106″ reaches the triangular vacant space 20 as is the case with FIG. 1 and is wedged in for a predetermined distance between the sloping portion 14a of the roll 14 and the vertical portion of the member 35, the upward motion of the stand 22 is caused to stops and the driving means 34 is actuated to allow the roller 14 to rotate around its own shaft 18 via bearing 17 while rotate around the peripheral edge of the opening of the cylindrical body 106″ to crush down the burr. In the meantime, the cylindrical body does not move in this apparatus although it rotates with the supporting means in the apparatus of FIG. 1. Comparing the apparatus of FIG. 1 with that of FIG. 3, it can be seen that there is some difference in the structure therebetween caused by whether the cylindrical body 106″ rotates or the roller 14 rotates. It is to be understood, however, that the functional effect is quite identical with each other.

When the apparatus shown above is used in the step subsequent to the trimming step to crush down the burr on the peripheral edge of the opening which may be caused by trimming, such undesirable results as injuring the printing roll or giving deformation or flange cracking of the cylindrical body can be avoided deep drawing step, the edge of which is subjected to trimming and thereafter flanging or neck-in and flanging.

It is obvious that the method and apparatus of the invention can also be applied to the case that the cylindrical body with a bottom end is simply formed by deep drawing, which is then subjected to trimming before flanging or neck-in and flanging work.

It is thought that the invention and many of its attendant advantages will be understood from the foregoing description and it will be apparent that various changes may be made in the form, construction and arrangement of the parts of the apparatus described without departing from the spirit and scope of the invention, the form hereinbefore described being merely a preferred embodiment thereof.

What I claim is:

1. In a method for manufacturing a metallic can which includes
    subjecting a metal blank to drawing and ironing steps to form an elongated cylindrical thin-walled body having a bottom at one end and an opening at the other end, said opening being defined by an encircling edge on said body wall at said other end, and then trimming the edge portion of said body at said other end to provide said body wall with a predetermined uniform height, the improvement which comprises
    pinching the outer periphery of the trimmed edge portion of said body wall between cooperating rotating surfaces to crush down toward said body wall any burr produced at said edge during trimming and extending radially and outwardly from said body wall and thus form on said body wall adjacent said edge surface a smooth sloped surface inclined inwardly from the body wall outer surface and merging with said edge surface.

2. A method according to claim 1 in which subsequent to pinching the trimmed edge portion of said body wall, said trimmed edge portion is subjected to necking-in followed by outward expansion of a part of said necked-in portion to form a flange on said body other end.

3. A method according to claim 2 in which subsequent to pinching the trimmed edge portion of said body wall and prior to necking-in and expansion of same, there is applied a printed coating to the surfaces of said body.

4. The method of claim 1 wherein said smooth sloped surface is formed such as to slope at an angle of about 10° to about 15° with the body wall outer surface.

* * * * *